(12) United States Patent
Hennion et al.

(10) Patent No.: US 9,616,649 B2
(45) Date of Patent: *Apr. 11, 2017

(54) MANUFACTURING LAMINATED GLAZING PROVIDED WITH AN ELECTRICAL CONDUCTOR

(71) Applicant: SAINT-GOBAIN GLASS FRANCE, Courbevoie (FR)

(72) Inventors: Alexandre Hennion, Venette (FR); Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,006

(22) PCT Filed: Oct. 8, 2013

(86) PCT No.: PCT/FR2013/052383
§ 371 (c)(1),
(2) Date: Apr. 10, 2015

(87) PCT Pub. No.: WO2014/057200
PCT Pub. Date: Apr. 17, 2014

(65) Prior Publication Data
US 2015/0283797 A1 Oct. 8, 2015

(30) Foreign Application Priority Data

Oct. 12, 2012 (FR) ..................... 12 59744

(51) Int. Cl.
*B32B 37/18* (2006.01)
*C03B 23/025* (2006.01)
(Continued)

(52) U.S. Cl.
CPC ...... *B32B 37/182* (2013.01); *B32B 17/10036* (2013.01); *B32B 17/1099* (2013.01);
(Continued)

(58) Field of Classification Search
CPC ............ B32B 17/10036; B32B 37/182; C03B 23/0258; C03B 27/0413; C03B 33/078
(Continued)

(56) References Cited

U.S. PATENT DOCUMENTS 4,124,367 A * 11/1978 Reese ............... B32B 17/10036
156/102
4,702,042 A * 10/1987 Herrington ............. B24C 1/045
451/40
(Continued)

FOREIGN PATENT DOCUMENTS

DE  2 332 915 B1  5/1974
DE  43 24 847 A1  1/1995
(Continued)

OTHER PUBLICATIONS

International Preliminary Report on Patentability and the Written Opinion of the International Searching Authority as issued in International Patent Application No. PCT/FR2013/052383, dated Apr. 14, 2015.

(Continued)

*Primary Examiner* — Philip Tucker
*Assistant Examiner* — John Blades
(74) *Attorney, Agent, or Firm* — Pillsbury Winthrop Shaw Pittman LLP

(57) ABSTRACT

A method for manufacturing dished laminated glazing including two sheets of glass, a separator layer made of polymer material arranged between the sheets of glass, and an electrical conductor, the method including the simultaneous thermal dishing of the sheets of glass in the paired (Continued)

Figure 6:
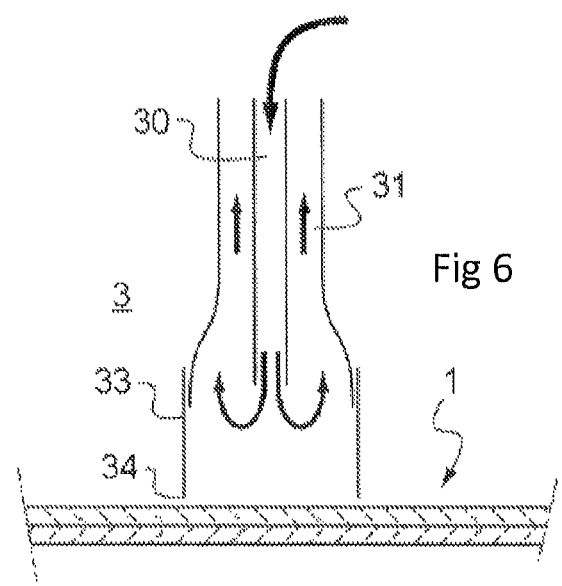

state followed by their cooling and then the assembly of the laminated glazing by bonding of the sheets of glass to the separator layer on either side thereof, the cooling including a controlled cooling of the sheets of glass in the paired state, the controlled cooling including a general controlled cooling and a local controlled cooling of a cutting zone, the local controlled cooling being faster than the general controlled cooling, a cutting of one of the sheets of glass along a cutting line in the cutting zone to form a holed zone, the electrical conductor being placed between the sheets of glass and exiting from the laminated glazing through the holed zone.

36 Claims, 4 Drawing Sheets

(51) Int. Cl.
  *C03B 27/04* (2006.01)
  *C03B 33/07* (2006.01)
  *B32B 17/10* (2006.01)
  *B32B 37/08* (2006.01)
  *B32B 38/00* (2006.01)

(52) U.S. Cl.
  CPC .. *B32B 17/10293* (2013.01); *B32B 17/10376* (2013.01); *B32B 17/10761* (2013.01); *B32B 17/10889* (2013.01); *B32B 37/08* (2013.01); *B32B 38/0004* (2013.01); *B32B 38/0012* (2013.01); *C03B 23/0258* (2013.01); *C03B 27/0413* (2013.01); *C03B 33/078* (2013.01); *B32B 2307/202* (2013.01); *B32B 2307/412* (2013.01); *B32B 2307/416* (2013.01); *B32B 2551/00* (2013.01); *B32B 2551/08* (2013.01); *B32B 2605/00* (2013.01)

(58) Field of Classification Search
  USPC .................................................. 156/101, 102
  See application file for complete search history.

(56) References Cited

U.S. PATENT DOCUMENTS

| 6,043,782 | A | * | 3/2000 | Dishart | ............. B32B 17/10036 |
| | | | | | 343/713 |
| 2011/0272974 | A1 | * | 11/2011 | Labrot | ............. B32B 17/10036 |
| | | | | | 296/215 |
| 2014/0234576 | A1 | | 8/2014 | Berard et al. | |
| 2014/0252808 | A1 | | 9/2014 | Hennion et al. | |

FOREIGN PATENT DOCUMENTS

| EP | 1 710 104 A2 | | 10/2006 | | |
| FR | 2 101 618 A5 | | 3/1972 | | |
| FR | 2 981 295 A1 | | 4/2013 | | |
| GB | 984881 | * | 3/1965 | ............. | C03B 27/00 |
| GB | 1 329 790 | | 9/1973 | | |
| WO | WO 02/064519 A1 | | 8/2002 | | |
| WO | WO 2004/087590 A2 | | 10/2004 | | |
| WO | WO 2006/072721 A1 | | 7/2006 | | |
| WO | WO 2010/100223 | * | 9/2010 | ............. | B32B 17/10 |
| WO | WO 2014/057224 A1 | | 4/2014 | | |

OTHER PUBLICATIONS

International Search Report as issued in International Patent Application No. PCT/FR2013/052383, dated Jan. 1, 2014.

* cited by examiner

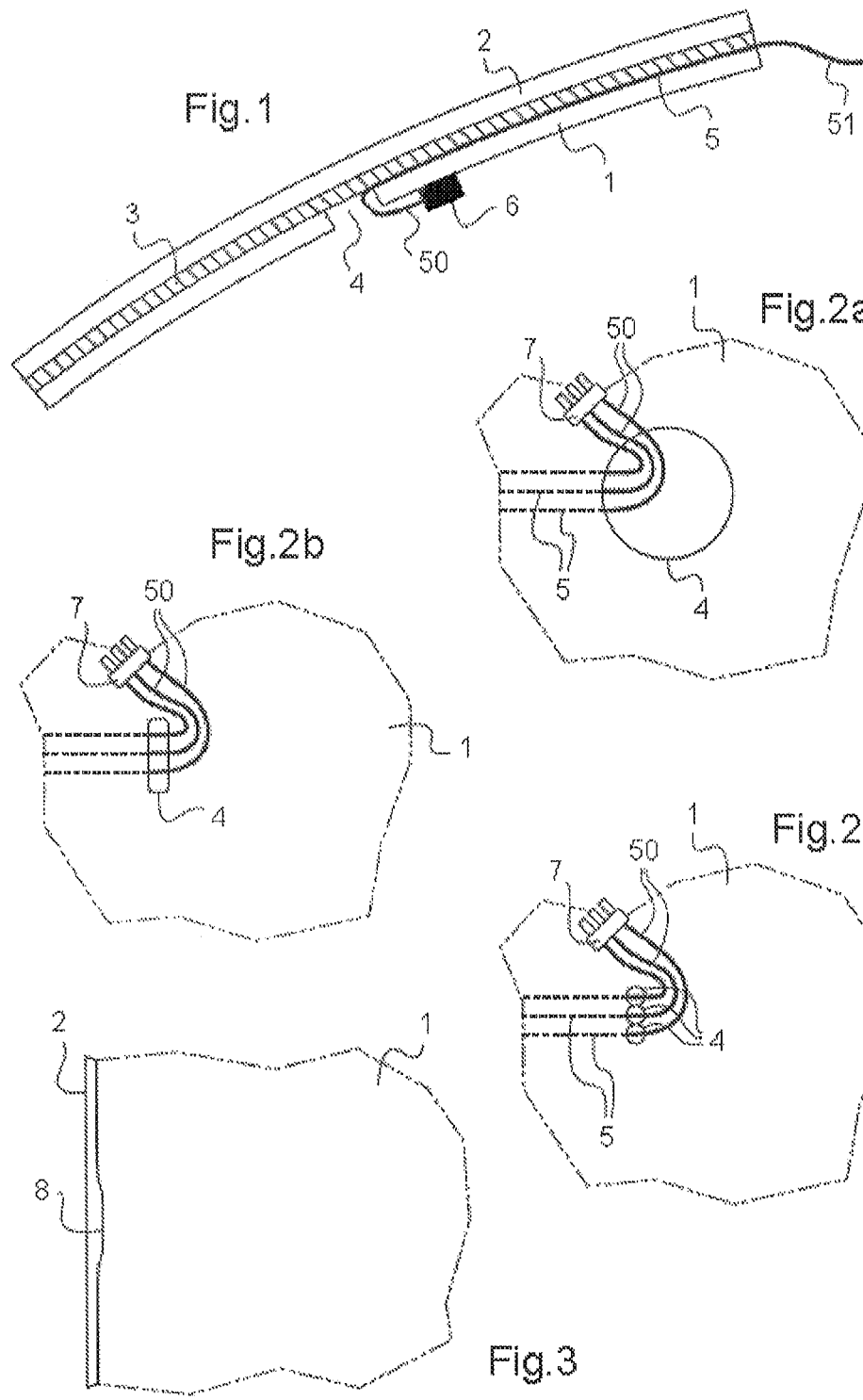

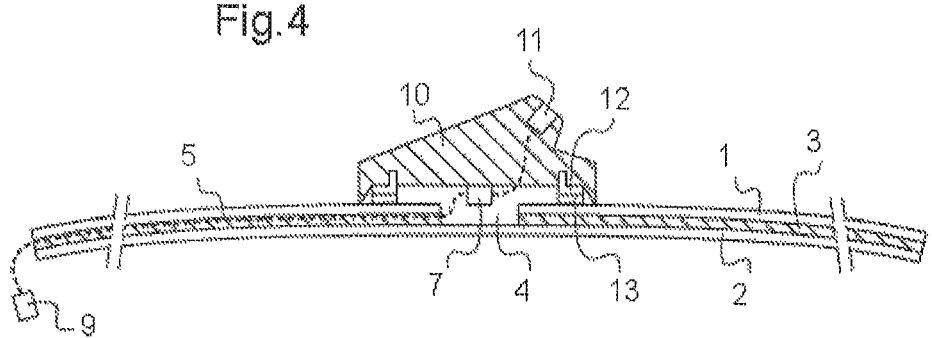
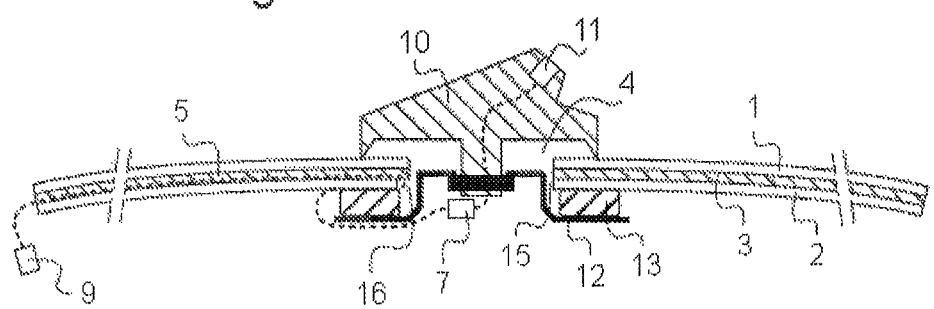

MANUFACTURING LAMINATED GLAZING PROVIDED WITH AN ELECTRICAL CONDUCTOR

CROSS-REFERENCE TO RELATED APPLICATIONS

This application is the U.S. National Stage of PCT/FR2013/052383, filed Oct. 8, 2013, which in turn claims priority to French Application No. 1259744, filed Oct. 12, 2012. The contents of all of these applications are incorporated herein by reference in their entirety.

The invention relates to a method for manufacturing laminated glazing comprising an electrical conductor between two of its sheets of glass and comprising the cutting of an orifice or of a notch in one of its sheets of glass for the passage of the conductor.

Laminated glazing comprises two sheets of glass (that is to say at least two sheets of glass) and a separator sheet made of polymer material placed between the two sheets of glass.

According to the prior art, the elements that require an electrical connection (whether to ensure an energy supply or communication function) and attached to the internal face of the glazing have to be linked to the wiring looms of the vehicle by a cable arranged along the internal face of the glazing. The existing solutions for concealing and protecting the power supply and communication cables, well known in the case of windshields at the level of the rear view mirror (rain sensor, brightness sensor, cameras, etc.) consist in:

applying a leaf of black enamel covering the zone on face 2 or 4 of the laminated glazing to protect the view from the outside of the vehicle;

installing a housing and a plastic channeling to cover the electrical device and the electrical conductors inside the vehicle.

It should be recalled that the surfaces of the sheets of glass of laminated glazing comprising two sheets of glass are usually numbered from 1 to 4, starting from the outer surface of the glazing intended to face toward the outside of the vehicle and ending with the outer surface of the glazing intended to face toward the interior of the vehicle.

The appearance of current automobile glazing units is greatly affected when the active elements have to be positioned inside the glazing. This is because, while the cladding of the electrical devices is acceptable when they are concealed by the interior rear view mirror, they become problematical in other places. In practice, the concealments and channelings are relatively bulky and mask a portion of the field of vision of the glazing; furthermore, they are made of plastic and protrude and adversely affect the overall appearance. Eliminating the plastic channeling and any object obstructing the view from the interior of the vehicle would make it possible to achieve a higher esthetic level more closely matching the demands of automobile constructors.

The idea has now been raised of using laminated glazing to route an electrical conductor from one place to another in the vehicle without requiring the use of a channeling that necessarily protrudes inside the vehicle. The laminated glazings considered in the present application more often than not serve as windshield or as motor vehicle roof but can also be fitted as a rear window or side window of the motor vehicle. The electrical conductor passes between two sheets of glass and it is either inside the separator made of polymer material or between this separator and one of the sheets of glass of the laminated glazing. The conductor enters into the laminated glazing at a first point and exits therefrom at a second point, at least one of these points corresponding to a holed zone of the hole or notch type produced in a sheet of the laminated glazing. Generally, one sheet of the laminated glazing produced according to the invention includes a hole. The invention is more particularly intended for the production of laminated glazing in which a first sheet includes a hole for the passage of a first end of an electrical conductor, the second sheet not including any holed zone facing the hole of the first sheet. In this case, the second end of the electrical conductor generally exits from the laminated glazing through the outer edge of the laminated glazing, a notch possibly being able to be produced at this point to simplify the passage of this second end. This notch is generally produced in the same sheet as that comprising the hole, and the second sheet can then be entirely free of any holed zone. The hole is produced according to the invention (application of a local controlled cooling) whereas the notch can be produced according to the invention or otherwise.

According to the method of the invention, the holed zone is produced on one of the sheets before assembly. The holed zone does indeed have an edge compression stress reinforcing said sheets mechanically. A holed zone can also be produced on facing zones of the two sheets of glass of the laminated glazing.

During their use, the glazings are subject to thermal or mechanical stresses, in particular in their handling, which they have to withstand to avoid breaking. For example, windshields of a vehicle undergo mechanical forces at their periphery when they are fitted on a vehicle body, whether manually or by a robot. In addition to the mechanical stresses, the glazing is subject to thermal stresses during windshield de-icing cycles. These thermal or mechanical stresses bring about risks of breakage notably at the edges of the glazing. In order to guarantee a good mechanical strength of the glazing, compression edge stresses are generated during the manufacture of the glazing. These edge stresses are known and specified in the specifications of the motor vehicle constructors. In addition to the outer edges of a glazing having compression stresses, compression stresses are preferably also generated around holed parts. The reinforcement of the edge of the holed part makes this zone more resistant to impacts and to handling operations and also makes it possible to use it for the fixing of an accessory (antenna, etc.).

French patent application no. 1159322 teaches a method for manufacturing a laminated glazing comprising at least two sheets of glass and at least one separator layer made of polymer material arranged between the sheets, the method comprising the dishing of the sheets, the controlled cooling of the sheets, the assembly of the sheets of glass and of the separator layer, said method comprising the following steps in the following order:

dishing of the sheets of glass,
controlled cooling of the sheets of glass,
formation of a laminated assembly comprising the sheets of glass and the separator layer,
cutting of the laminated assembly right through its thickness along a line on one of its main faces, the controlled cooling comprising a general controlled cooling and a local controlled cooling of a zone including the cutting line, the local controlled cooling being faster than the general controlled cooling. The local controlled cooling produces edge stresses along the cutting line.

The sheets of glass used in the context of the present invention may or may not be covered with one or more thin layers (such as anti-glare, solar protection, scratch-resistant, etc.).

A sheet of glass comprises two main faces; the same applies for a laminated assembly. The expression "laminated assembly" can designate the final laminated glazing.

In the context of the present invention, an electrical conductor is in intimate contact with the separator made of polymer material and passes through a holed zone which is a hole or a notch. The presence of edge compression stresses around the hole or the notch is particularly important in this context. This is because the electrical conductor, incorporated in or against the separator sheet made of polymer material, slightly and locally increases the volume of material confined between the two sheets of glass. The latter will therefore be slightly deformed during the manufacture of the product, more particularly when the residual air is removed from between the sheets of glass and the separator sheet during the so-called "assembly" phase of the laminated glazing. This slight local deformation of the two sheets of glass in the vicinity can be mitigated during the manufacturing steps in which the glazing is heated (such as during passage through the autoclave), the polymer then softening and being likely to creep. Nevertheless, there still remains a residual deformation of the two sheets which generates local deformation stresses along the electrical conductor and more specifically at the edges of the orifice or of the notch where this conductor exits from between the sheets of glass. The residual compression stresses at the edge of this orifice or notch therefore have to be sufficient to withstand the mechanical or thermomechanical external loading stresses described above but also the stresses induced by the permanent deformations of the two sheets of glass due to the presence of the conductor.

The stresses in glass products are generated when the glass is heated to a temperature from which it loses its pure elastic behavior and becomes slightly plastic, of the viscoelastic liquid type. During the cooling and depending on the initial thermal non-uniformity of the sample and/or the uniformity of the cooling itself, some zones set before others. Because of the thermal expansion, permanent compression and extension stresses appear within the sample during its cooling. Qualitatively, the parts where the glass is set first correspond to the parts where the compression stresses are concentrated whereas the parts where the glass is set with a delay concentrate the extension stress zones. The edge stresses described in the present application are membrane stresses which can be defined at any point M of the material and for a given direction, such as the average of the stress field at this point and in this direction, the average being calculated throughout the thickness of the sample. At the edge of the sample, only the membrane stress component parallel to the edge is appropriate; the perpendicular component has a zero value. Thus, any measurement method allowing for a measurement of the average stresses along an edge and through the thickness of the sample is relevant. The methods for measuring edge stresses use photoelasticimetry techniques. The two methods described in the ASTM standards cited below make it possible to measure the edge stress values:

- the method using the Babinet compensator and described in the standard ASTM C1279-2009-01, procedure B;
- the measurements performed with market-standard appliances such as Sharples model S-67 marketed by the company Sharples Stress Engineers, Preston, UK and using a so-called Senarmont or Jessop-Friedel compensator. The measurement principle is described in the standard ASTM F218-2005-01.

In the context of the present application, the compression stress values are determined by the method described in the standard ASTM F218-2005-01.

Generally, the compression stress values are determined between 0.1 and 2 mm from an edge and preferably between 0.5 and 1 mm from an edge.

According to the invention, the different sheets of glass that have to be assembled to form a laminated glazing are dished together in the paired state (that is to say, forming a pair such that one main surface of one sheet is in contact with one main surface of the other sheet, the two sheets generally being superposed one on top of the other to form a stack), so that they both assume the same curvatures during the thermal dishing. The simultaneous dishing in the paired state of the two sheets intended to be assembled together offers the advantage that the different sheets of glass can be of possibly different thickness and tint. In practice, the two sheets will indeed assume the same curvatures despite their differences.

According to the invention, the piercing creating the holed zone can be performed before dishing or after dishing on one of the sheets of glass or on both. The optical quality of the final glazing is generally better when the piercing is done after dishing, because the latter has not been influenced by the holed zone in proximity thereto. For the case where the piercing is performed on the two sheets of glass, it can be performed such that the holed zones of the sheets of glass are facing or not facing one another in the laminated glazing. The choice of the piercing point depends on the desired end product.

The invention relates to a method for manufacturing dished laminated glazing comprising two sheets of glass, a separator layer made of polymer material arranged between the sheets of glass, and an electrical conductor, said method comprising the simultaneous thermal dishing of the sheets of glass in the paired state followed by their cooling and then the assembly of the laminated glazing by bonding of the sheets of glass to the separator layer on either side thereof, said cooling comprising a controlled cooling of the sheets of glass in the paired state, the controlled cooling comprising a general controlled cooling and a local controlled cooling of a cutting zone, the local controlled cooling being faster than the general controlled cooling, a cutting of one of the sheets of glass along a cutting line in the cutting zone to form a holed zone, the electrical conductor being placed between the sheets of glass and exiting from the laminated glazing through the holed zone.

The polymer material is generally a polyvinyl butyral, more generally referred to as PVB by those skilled in the art.

The aim of the invention is notably to propose a method for manufacturing laminated glazing in which at least one of its sheets of glass, even both sheets of glass, is provided throughout its thickness with an edge cut along a cutting line, before assembly of the laminated sheets of glass, said edge exhibiting edge compression stresses. The edge cut along the cutting line determines the holed zone and has the form of an orifice or of a notch in the outer edge of the glazing. The method according to the invention guarantees compression stresses of the cut edge according to an intensity that is uniform and sufficient along this edge. In the case of a notch, the method according to the invention is preferably applied to a notch that has a depth of at least 0.5 cm in the edge of a sheet of glass toward the inside of said sheet of glass. Generally, the notch is produced in just one of the sheets of glass, with no holed zone in the other sheet of glass at the same point (facing the notch).

According to the invention, a holed part in a sheet of glass is a hole or a notch passing through the whole of its thickness. A hole (synonymous with orifice) has an outline that is closed on itself entirely within the main faces of the cut sheet of glass. A notch constitutes a discontinuity of the outer edge of the sheet of glass to form a part that is holed toward the inside of the main faces of the sheet of glass. It can be considered as an open hole in the edge of the sheet of glass. In the context of the invention, any holed zone of a sheet of glass can be qualified as "through", that is to say right through the thickness of said sheet of glass.

The holed zone, notably an orifice, can be produced in a first sheet of glass, whereas no holed zone is produced in the second sheet of glass facing the holed zone of the first sheet of glass (when the two sheets of glass are assembled to form the laminated glazing). In this case, the separator layer is preferably not cut facing the holed zone of the first sheet of glass, except, if appropriate, along an outline corresponding to that of the electrical conductor that has to pass through it.

An orifice in a sheet of glass for the passage of the electrical conductor can have a diameter of between 3 and 80 mm.

In the context of the present application, the following two types of cooling applied to the sheets of glass when they are in the juxtaposed state are distinguished:
  a) the "general controlled cooling" which makes it possible to generate compression stresses on the outer edges of the sheets in order to obtain a sufficient mechanical strength at these edges. This cooling is exerted globally to all of the glazing; this type of global cooling is well known to those skilled in the art;
  b) according to the invention, a "local controlled cooling" is exerted, in order to generate compression stresses on the edges of the line already cut or which will be cut. This local controlled cooling is faster than the general cooling.

Thus, the method of the invention provides various advantages, notably:
  a good compatibility of form between the two sheets of glass because of their simultaneous dishing in the paired state, which guarantees a better quality of assembly,
  existence of compression stresses on the edges created by the cutting because of the more intense local controlled cooling on the zone covering the line provided for the cutting.

The local controlled cooling constitutes a non-uniform cooling of the main faces. It can be applied to just one or both of the main surfaces of the stack of the paired sheets subjected to the cooling.

The local controlled cooling of the cutting zone (including the cutting line) is faster than the general controlled cooling of the sheets. The local cooling is applied at the cutting line, before or after the actual cutting. This local cooling zone covers all of the cutting line generally by at least 1 mm on either side of this line. The local cooling can be widened in a neighboring zone which will not necessarily be directly subjected to the cutting tool. As an example, if a hole of several centimeters diameter is to be produced in a sheet of glass after having carried out the local cooling, the local cooling can be carried out over all the surface corresponding to the hole (in fact a little wider than the hole), whereas the cutting will be applied only along the outline of the hole. In the case of a hole of relatively large size (hole through which a cylinder of 50 mm diameter could pass), it is preferable to apply the local controlled cooling only to the line intended to be cut or already cut. It is in fact pointless applying this local controlled cooling over the entire surface that is holed or intended to be holed, if the latter is large.

The local controlled cooling is obtained by convection, conduction, radiation, or a combination of these means.

The general controlled cooling is applied directly after the dishing. Generally, the local controlled cooling is applied between the start and the end of the general cooling. However, beginning the local cooling toward the end of the dishing when the general cooling has not begun is not precluded. Thus, the local controlled cooling is generally applied in a cooling chamber, preferably at the start of the general cooling of the glazing in the cooling chamber. As a variant, it can be begun at the end of the dishing chamber.

A controlled cooling chamber applies the general controlled cooling. If the local controlled cooling is also applied therein, this chamber is also equipped with means necessary for the application of this local controlled cooling. This means can, for example, be a nozzle blowing locally onto a face of the paired sheets of glass. It can also be a cold metallic element (cooled internally by air for example) coming into contact with the local zone to be cooled more rapidly.

Advantageously, the dishing and the cooling are both carried out on the two sheets of glass arranged in the paired manner. Notably, the two paired sheets can travel through at least one dishing chamber and then through at least one controlled cooling chamber, the local controlled cooling possibly beginning in the last dishing chamber or in the controlled cooling chamber.

The dishing of the sheets of glass can notably be carried out by pressing and/or suction at the dishing temperature, as taught by WO02064519, WO2006072721, WO2004/087590. This dishing is carried out on the sheets of glass that have to be then assembled, in a paired manner. Notably, the two paired sheets of glass can travel through gravity pre-dishing chambers, then through a pressing and/or suction chamber and finally through controlled cooling chambers, the local controlled cooling possibly beginning at the end of dishing or in the cooling chambers. The controlled cooling begins at a temperature greater than 580° C. (generally between 650 and 580° C.) and continues at least until the temperature drops to 520° C., even below this temperature. It is carried out in the cooling chambers, possibly beginning earlier in the last dishing chamber.

The dishing of the paired sheets of glass is performed with no organic material between them in light of the temperature needed for the thermal dishing. The thermal dishing is performed before assembly with the separator made of polymer material since the latter begins to degrade from 160° C. with the formation of bubbles. If it were to be cooled from such a low temperature, it would moreover be impossible to generate permanent edge compression stresses in the glass.

The dishing is not necessarily applied in a chamber, the dishing tools being able to be in the open air.

Similarly, the general and local controlled coolings are not necessarily applied in a chamber.

Preferably, the start of the general controlled cooling is controlled with a speed lying within the range from 0.3 to 8° C./second and even more preferably from 0.3 to 2° C./second, at least until the temperature of the glass (between 650 and 580° C. on leaving the dishing) reaches 520° C. This controlled cooling is therefore carried out at least between 580 and 520° C.

The local controlled cooling is applied from just one side facing one of the faces of the two paired sheets of glass, or else from the two opposite sides of the two sheets of glass that are paired and facing one another. If the local controlled cooling is applied against the surface of just one sheet of glass, it produces its effects throughout the thickness of the two paired sheets of glass, provided that the thickness of the paired sheets is not too great, obviously, and that the local cooling is of sufficient duration and intensity. The controlled local cooling can be applied from just one side of the stack of sheets on the condition of guaranteeing a local controlled cooling that is faster, throughout the thickness, than the general controlled cooling. It can also be applied from both sides facing one another.

The local controlled cooling of the cutting zone, applied to the cutting line (before or after cutting), is sufficient in duration and intensity for the edge stresses of the holed zone after cutting to be greater than 4 MPa and preferably greater than 8 MPa. This adjustment can easily be made using routine tests.

The general controlled cooling of the glazing can, as is known, use a heat transfer such as convection, radiation, conduction, or a combination of these three heat transfer modes.

In the present application, the zone having undergone the local controlled cooling can be called "zone under compression" or "compression zone".

The differentiated and localized cooling of the sheets of glass to obtain the compression zones can be performed by any means, for example by convection, or radiation, or even conduction, or else a combination of these means. This local differentiated cooling consists in cooling more rapidly on the line that is cut or intended to be cut.

Convection consists in blowing cold air (air at a temperature lower than that of the glass, typically less than 450° C., and generally at room temperature) directed onto the zones that are to be compressed. Depending on the average speed of cooling of the glazing, the temperature of the injected air and/or the intensity of the blowing will be adjusted. Thus, the local controlled cooling can be performed by locally blowing air colder than the ambient air surrounding the sheets of glass in the paired state.

Conduction entails bringing the parts of the glass that are to be cooled more rapidly into contact with a material that is colder than the surface of the glass.

With respect to radiation, it is possible to use a colder material that is placed facing the glass. The heat exchange by radiation will allow for a greater local cooling of the zone facing the material.

The differentiated and localized cooling of the sheets of glass to obtain the compression zones can also involve the use of screens which limit the cooling speed outside the zones where the compression stresses are to be established. Outside of the screens, zones are thus created which will correspond to the compression zones, for which the cooling of the glass is greater. An example of a screen is an insulator material, in particular fibrous, of surface area equivalent to that of the glazing and in which openings are formed. The material is placed close to the hot glass during its cooling phase. When placed in a cold environment, the parts of the glazing located facing the openings are cooled more rapidly than those which are screened.

It is consequently possible to use coating materials which increase or reduce emissivity of the glass at the surface.

It is possible to use a coating that is more emissive than the surface of the glass and place it against desired compression zones, these zones then being cooled more rapidly.

Conversely to the above example, it is possible to use a coating that is less emissive than the surface of the glass and place it against the surface of the glass outside of the desired compression zones, these zones then being cooled more slowly than the zones to be compression-stressed.

For the materials which increase or reduce the surface emissivity of the glass, it is possible to use materials that can easily be used to coat the surface of the glass. In this case, they are preferably non-toxic, temperature-resistant, and can easily be dispersed or dissolved in water.

The start of the general cooling is preferably controlled between 0.3 and 2° C. per second from the end-of-dishing temperature, between 580° C. and 650° C., at the dishing-stage output until the temperature of the glass reaches 520° C., even lower. Below 520° C., it is possible to apply a convective cooling of the glazing assembly in order to speed up the process. Below 480° C., it is pointless continuing to apply the local controlled cooling, since all of the glazing can then undergo the same general cooling. The glass leaves an optional cooling chamber generally at less than 300° C.

By way of example, the local controlled cooling is applied by means of an air blowing nozzle, one end of which has a section of suitable form for blowing onto the line to be cut, and it is applied against at least one of the sheets of glass at the line to be cut. For example, if the line to be cut is circular, the orifice of the nozzle can take the form of a disk or of a ring. In the case of a disk, the diameter of the disk is slightly greater than that of the circle to be cut, and it is the whole surface within the circle which will undergo the local controlled cooling. In the case of a ring nozzle, the air is blown over a ring-shaped zone on the circle and not inside this ring.

As a variant, or in combination, the local controlled cooling is obtained by the application against, or in the vicinity of, the surface of the glass, of a temporary coating material, notably of fabric type increasing or reducing the thermal radiation to or emitted by the glass, and provided with at least one opening, this opening corresponding to the zone including the cutting line or else to the remaining part of the glazing (zone not including the cutting line) depending on the type of material. In this case, the differentiated cooling (more intense local cooling on the cutting line than the general cooling to the side of the cutting line) is here obtained by acting on the difference in thermal radiation emitted by the glass as a consequence of the application of the temporary coating material.

As a variant, or in combination, the local controlled cooling is obtained by the application, against the surface of the glass, of a contact material at the temperature lower than that of the glass, the zones in contact including the cutting line. This may be an element made of cold metal such as steel covered with a metallic fabric to avoid thermal impacts. This element made of cold metal can be passed through by a coolant (air or water) to keep it cold. The differentiated cooling (local cooling that is faster than the general cooling to the side of the zone to be cut) is here obtained by acting on the difference in heat transfer by conduction emitted by the glass as a consequence of the application of the contact material.

In addition to the electrical conductor, the holed zone may be intended to accommodate a functional part (like an antenna, a stop light, a camera, etc.) fixed to one or both of the assembled sheets of glass.

The laminated glazing may be shaped at the edge of the cut of the holed zone, for example chamfered on at least one of the sheets, or on both sheets.

The cutting step is obtained by known cutting means such as a saw (notably diamond hole saw), a milling machine (notably diamond), a water jet. Depending on the chosen cutting means, it is possible to cut a single sheet of glass or the stack of both sheets of glass paired together from one or both sides of said stack.

The general controlled cooling generates compression stresses on the outer edges of the sheets of glass, forming a peripheral belt of compression stresses. They are generally between 4 and 20 MPa. The belt of edge compression stresses generally has a width on each main face of the glazing of 0.1 to 3 cm from the outer edge.

The laminated glazing according to the invention can be symmetrical in relation to a median longitudinal plane passing through the middle of its front transversal strip and the middle of its rear transversal strip (the "longitudinal" direction corresponding to the direction of movement of the vehicle, the "transversal" direction being at right angles to it), notably in the case of a windshield or of a rear window. This plane also passes through its barycenter.

The controlled cooling (general and local) is applied when the paired sheets of glass have just been dished at their dishing temperature. The entire cooling process is generally performed directly from the dishing temperature. Outside of the zones undergoing the controlled local cooling, the temperature of the glass generally drops from the dishing temperature to room temperature without ever rising again (monotonic temperature drop).

The cutting can be performed on the flat sheet of glass before its thermal dishing, or after the cooling on the dished sheet of glass. The cutting is done either before the dishing when the sheets are planar and at room temperature, or after the dishing and the cooling. The cutting is generally performed at room temperature.

If the cutting has to pass through both sheets at the same point, it is not essential to separate the pair of sheets for this cutting. It is nevertheless possible to separate the pair of sheets and perform the cutting on each of them independently. If one of the sheets has to be cut at one point while the other does not have to be cut at the same point, the paired sheets are separated and the cutting is performed on the sheet that has to be cut. Each sheet may need to be cut at a different point of the final glazing, in which case there will be a local controlled cooling for each of these points while the sheets are paired together, then, after cooling, the pair of sheets will be separated for them each to be cut individually at the desired point if this was not done before the dishing.

According to a first variant, it is possible to proceed as follows:
  preparation of two planar sheets of glass; at this stage, their outer edge has been cut but they do not yet have a holed zone; then
  cutting to form a holed zone on a single sheet or on both sheets, at the same point (sheets paired together or not) or at different points; then
  thermal dishing of the paired sheets; then
  general controlled cooling and, at each cut point, local controlled cooling; then
  assembly of the laminated glazing, the electrical conductor exiting through a holed zone (even two holed zones).

According to a second variant, it is possible to proceed as follows:
  preparation of two planar sheets of glass; at this stage, their outer edge has been cut but they do not yet have any holed part; then
  thermal dishing of the paired sheets; then
  general controlled cooling and, at each point that has to be cut, local controlled cooling; then
  cutting at each point having undergone the local controlled cooling, to form a holed zone on a single sheet or on both sheets, at the same point (sheets paired together or not) or at different points; then
  assembly of the laminated glazing, the electrical conductor exiting through a holed zone (even two holed zones).

When it is stated above that the two sheets of glass have been cut "at the same point", this means that the holed zones of the two sheets are facing one another in the final laminated assembly.

The polymer material acting as separator between the two sheets of glass can be cut at the point corresponding to the holed zone, before assembly of the laminated glazing, notably if the holed zone is of small size, such as an area less than 1 cm². However, this is not necessary if a single sheet is cut at one point while the other is not cut at the same point. In this case, it is even preferable to leave the separator in place in order to ensure a good resistance to impact on the glazing. In the case where the electrical conductor is at the interface between the uncut glass and the separator made of polymer material, an orifice can be produced in said separator in order to allow the electrical conductor to pass through said orifice. This orifice should be just big enough to allow the electrical conductor to pass through. It therefore has roughly the same size as the electrical conductor. In this case in point, the holed zone, notably an orifice, is produced in a first sheet of glass, no holed zone being produced in the second sheet of glass facing the holed zone of the first sheet of glass (once the laminated glazing is assembled), the separator layer being uncut facing the holed zone of the first sheet of glass except according to an outline corresponding to that of the electrical conductor passing through it.

The electrical conductor may be placed in the separator or bonded to the separator before assembly of the laminated glazing. If the electrical conductor is bonded to the separator, the polymer material will creep during assembly to encapsulate the electrical conductor at least partially. The electrical conductor may also be bonded onto a sheet of glass before assembly of the laminated glazing. In this case, during assembly, the polymer material will creep to encapsulate, at least partially, the electrical conductor.

The electrical glazing may be provided with one to ten electrical conductors, even more. The different electrical conductors with which the laminated glazing is equipped may be arranged parallel to one another.

The electrical conductor may, for example, be a single wire cable made of conductive metal, notably of cuprous metal. It may be bare or surrounded by an insulator. The electrical conductor may be a ribbon cable containing a plurality of metallic electrical cables. This ribbon cable may be made of a polymer material in which a plurality of parallel metallic cables are embedded. The ribbon cable is prepared before being applied to the separator or to one of the sheets of glass. The electrical conductor (bare cable, insulated cable, ribbon cable, etc.) may have a thickness (at right angles to the glazing) in the range from 0.05 to 1 mm, notably from 0.08 to 0.5 mm. The electrical conductor may comprise a plurality of conductive metallic cables, for example 2 or 3 or 4 or 5 or 6 cables, even more.

FIG. 1 represents a cross-sectional view of a laminated glazing that can be produced according to the invention. The laminated glazing comprises a first sheet of glass 1, a second sheet of glass 2 and a separator film 3 made of thermoplastic polymer, arranged between the two sheets of glass. The separator film is, for example, a film of PVB, standard or with acoustic damping properties. The first sheet of glass comprises a first through hole 4. The first sheet of glass 1 may equally be positioned on the inside or on the outside of the vehicle, depending on the applications. Furthermore, the separator film may include a through hole coinciding with the first through hole 4 of the first sheet of glass, as represented in FIG. 4.

The laminated glazing also comprises at least one conductor wire 5 (FIG. 1) which is embedded in the separator film 3 or which is arranged between the separator film 3 and the first sheet of glass 1, or else which is arranged between the separator film 3 and the second sheet of glass 2. This provides it with a protection which is incorporated in the laminated glazing. When the conductor wire 5 is arranged between the separator film 3 and the second sheet of glass 2, the separator film 3 may be provided with a through hole which coincides with the first hole 4 of the first sheet of glass 1 to allow the conductor wire 5 to pass through the separator film 3 and through the first sheet of glass 1. The conductor wire 5 has an end 50 intended to be connected to an accessory 6, for example an electrical accessory, preferably via a connector (7 in FIGS. 2, 4 and 5). The other end 51 of the conductor wire 5 is intended to be connected to an electrical power supply and/or an electrical device on the vehicle, preferably via a connector (9 in FIGS. 4 and 5). One end 50 of the conductor wire 5 exits from the laminated glazing through the first through hole 4. The first through hole 4 is, for example, circular, for ease of manufacture. It should be as small as possible to allow the laminated glazing to comply with the R43 standard and big enough to allow for the passage of the conductor wire, even of the connector, through it. Thus, preferably, the first through hole 4 has a diameter of between 3 and 80 mm.

The connector 7, 9 makes it possible to protect the end of the conductor wire 5 during transportation and handling. The connector 7, 9 is preferably as compact as possible while being mechanically stable and being capable of ensuring a reliable electrical connection in a vehicle environment, in particular by withstanding the various potential aggressions such as vibrations, significant temperature variations, oxidizing atmosphere, etc.

Preferably, the conductor wire or wires 5 is/are coated in a plastic film forming a thin and flexible ribbon cable. The plastic film may be transparent (which makes it possible to have a very discrete product), black (which avoids adding black enamel to the glass to mask the conductor wires), or else colored (which makes it possible to enhance the appearance of the finished product, once incorporated in a glazing). The use of such a ribbon cable also provides ease of handling during assembly. The ribbon cable is preferably equipped with connectors at each of its ends before the assembly of the glazing. Furthermore, in order to simplify the fitting, the ribbon cable may be coated with PVB or an adhesive to allow for its adhesion to the first sheet of glass. Finally, the ribbon cable should in addition be sufficiently thin as to not permanently flex the glass during assembly and thus avoid any breakage of the glass at the edge of the hole or holes through which the ribbon cable leaves. To mitigate this, the glass has edge stresses at the periphery of the exit holes of the ends of the conductor wires.

The accessory 6 to which the conductor wire or wires 5 is/are intended to be connected can be fixed to the laminated glazing, as represented in FIG. 1, or in proximity to the laminated glazing, for example on a rear view mirror mounting. The accessory 6 is, for example, a rain or moisture sensor, a brightness sensor, a camera, an antenna, a lighting device, a fan or a GPS positioning device. The conductor wire 5 makes it possible to electrically supply the accessory 6 and/or bring information transmitted by the accessory 6 to the electrical device of the vehicle. The conductor wire 5 is, for example, made of copper. Depending on the applications, for example for the connection to a camera, the conductor wire or wires 5 may be shielded.

Depending on the type of accessory, one or more conductor wires 5 are necessary. In the case of a plurality of conductor wires 5, they are preferably arranged one alongside the other. They can be linked by a transparent or opaque film in the form of a ribbon cable. The first sheet of glass 1 may include as many through holes as there are conductor wires and the end 50 of each conductor wire 5 may then exit from the laminated glazing through a first dedicated through hole of the first sheet of glass.

FIGS. 2a, 2b, 2c are a detailed view, according to three respective embodiments, of the laminated glazing according to the invention with a plurality of conductor wires.

In FIG. 2a, the first sheet of glass 1 comprises a single first through hole 4, of circular form, through which exit the ends 50 of the conductor wires 5 intended to be connected to an accessory.

In FIG. 2b, the first sheet of glass 1 includes a single through hole 4, in the form of a slot, through which exit the ends 50 of the conductor wires 5 intended to be connected to an accessory.

In FIG. 2c, the first sheet of glass 1 includes three first through holes 4, of circular form, through each of which exits the end 50 of a conductor wire 5 intended to be connected to an accessory.

The circular through holes can be produced by cutting using a hole saw. The through holes in the form of a slot may be produced by piercing by water jet or by machining using a diamond mill.

The end 50 of the conductor wire or wires 5 intended to be connected to the accessory 6 may be inserted into a connector 7, as represented in FIGS. 2a to 2c, which simplifies the connection to the accessory 6, in particular when the latter takes place well after the manufacture of the laminated glazing.

FIG. 3 is a detailed view of the edge of the laminated glazing according to an embodiment of the invention.

The first sheet of glass 1 may comprise a second through hole or a notch 8 at the edge of the glazing, as represented in FIG. 3. This notch 8 allows for the exit of the other end 51 of the conductor wire 5 for a connection to an electrical power supply and/or an electrical device on the vehicle. This other end 51 may be inserted into a connector 9 (FIGS. 4 and 5) for subsequent ease of connection to the vehicle. The second through hole of the first sheet of glass 1 may be produced on the edge of the first sheet of glass 1, for example in the form of a notch 8, as represented in FIG. 3, or in proximity to the edge of the first sheet of glass 1.

When the first sheet of glass 1 comprises neither second through hole nor notch, the end 51 of the conductor wire 5 exits from the laminated glazing via the edge of the laminated glazing, as represented in FIG. 1.

Optionally, the laminated glazing also comprises at least one strip of opaque enamel coinciding with the conductor wire or wires, concealing the conductor wire or wires from sight from outside and/or inside the vehicle.

However, since the conductor wires embedded in the separator film may be very thin (a few tens to a few hundreds of microns) and the conductor or the ribbon cable containing the conductor have a thin width (a few millimeters to some fifteen millimeters), the strip of enamel may be indeed thinner than when channeling is used. The strip of enamel is, moreover, much thinner than a channeling, which makes it possible to significantly enhance the field of view and visual comfort.

The laminated glazing may also comprise an accessory 6 fixed onto the laminated glazing. The accessory 6 may be fixed to the edges of the first through hole or holes 4 of the first sheet of glass 1, for example by snap-fitting or by bonding, or in proximity to the first through hole or holes 4 of the first sheet of glass 1, for example by bonding. As a variant, the accessory may also be housed inside the through hole 4 of the first sheet of glass 1 and be fixed, for example by bonding, onto the second sheet of glass 2, on face 2 or 3 of the laminated glazing depending on the positioning of the first and second sheets of glass in the laminated glazing.

Moreover, the second sheet of glass may also include a through hole (15, FIG. 5). In the latter case, the first through hole 4 of the first sheet of glass 1 and the through hole 15 of the second sheet of glass 2 preferably have substantially the same diameter and face one another. The separator film is then also provided with a through hole which coincides with the first holes 4, 15 of the first and second sheets of glass 1, 2, as represented in FIG. 5.

FIGS. 4 and 5 are cross-sectional views, according to two respective embodiments, of a laminated glazing according to the invention with an antenna accessory fitted on the glazing. These figures are exemplary embodiments of a laminated glazing including an antenna.

An antenna base 10 is fixed onto the laminated glazing by fixing means 13, for example glue, via support means 12. The antenna base 11 comprises a connector 11 to which the conductor wire 5 is connected via the connector 7.

In these embodiments, the first sheet of glass 1 faces toward the outside of the vehicle. Water-tightness is ensured by the fixing means 13 which entirely surround the through holes.

In the embodiment of FIG. 5, the second sheet of glass also includes a through hole 15. In FIG. 5, the through hole 15 coincides with the first through hole 4 and also comprises a notch 16 to facilitate the passage of the conductor wire 5.

FIG. 6 illustrates a schematic device 3 adapted to blow onto one of the sides of the superposed sheets. At this stage, the sheets have already been dished, the orifice provided in one of them not yet having been pierced. The sheets are represented during cooling immediately following the dishing operation. The nozzle 3 applies a local controlled cooling during the general controlled cooling. Here, air is blown at room temperature over an area in the form of a disk in order to subsequently produce a recess on the sheet shown in the top position. The blowing time is between approximately 40 and 90 seconds. The blowing time is independent of the surface to be cooled in a differentiated manner but, on the other hand, depends on the thickness of the glass. The 40 seconds of local cooling are established for sheets which each have a thickness of 2.1 mm. The blowing nozzle has a termination of a form suited to the geometrical form of the local zone of compression stresses to be obtained. It can notably have the form of a square or rectangular outline. In FIG. 6, the nozzle 3 comprises a central air supply duct 30, an asymmetrical duct 31, around the central supply duct 30. The duct 31 emerges at the termination of the nozzle on a cylindrical bell 33 whose wall is made up of a flexible felt based on metallic fibers. The free end 34 of the bell is placed against the surface of the glass. Cold air is brought via the supply duct 30 to the bell 34 to be released against the surface of the glass to be cooled and then is discharged via the duct 31. After the cooling, the two paired sheets are separated. The recess is then produced by cutting one of the sheets of glass in a manner known to those skilled in the art. Then, the steps of assembly with the separator, of degassing of the assembly and of passage into the autoclave are performed, the metallic conductor having been judiciously placed between the two sheets of glass. This treatment leads to a bonding between the separator and the sheets of glass on each side of the separator.

Figure 7:
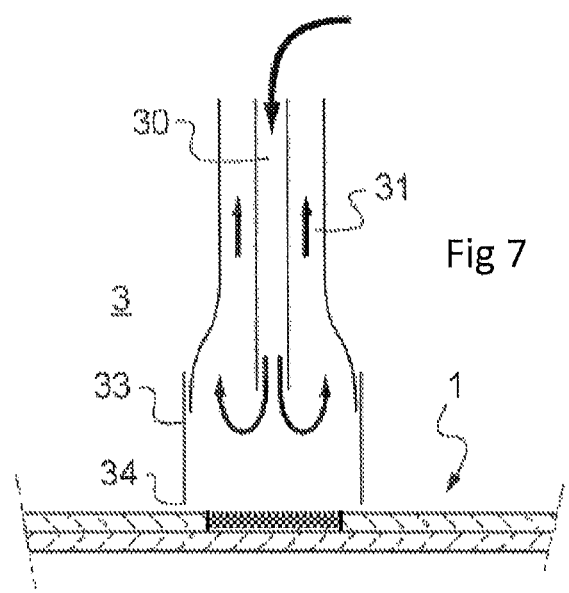

FIG. 7 illustrates the same device as that of FIG. 6, except that the sheet of glass in the top position has been previously pierced individually while it was planar and not yet dished. The two sheets were then paired together, then dished simultaneously in the superposed state. During cooling following the dishing at the dishing temperature, the local controlled cooling was applied as shown in FIG. 7 during the general controlled cooling applied to all the sheets. The blowing time is between approximately 10 and 90 seconds. It can be seen that the blowing zone applying the local controlled cooling is greater than the orifice itself.

Figure 8:
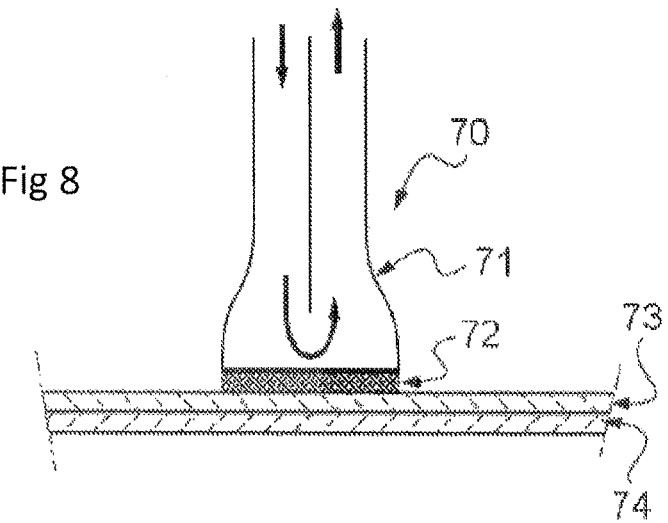

FIG. 8 illustrates a schematic device 70 suitable for cooling, by conduction, a local zone by a main face of a stack of two superposed sheets 73 and 74. At this stage, the sheets have already been dished, the orifice provided in one of them not yet having been pierced. The sheets are represented during cooling immediately following the dishing operation. A local controlled cooling is applied during the general controlled cooling. A metal pipe 71, closed at its bottom end, is passed through by cold air as indicated by the arrows. The contact with the glass between the metal pipe and the glass is softened by virtue of a felt 72 made of refractory fibers to reduce the risk of breakage by thermal impact. The end result is thus the formation of a local zone of compression stresses the point of contact between the felt 72 and the glass. After the cooling, the two paired sheets 73 and 74 are separated. The recess is then produced by cutting one of the sheets in a manner known to those skilled in the art. Then, the steps of assembly with the separator, of degassing of the assembly and of passage into the autoclave are performed, the metal conductor having been judiciously placed between the two sheets of glass. This treatment leads to a bonding between the separator and the sheets of glass on each side of the separator.

Figure 9:
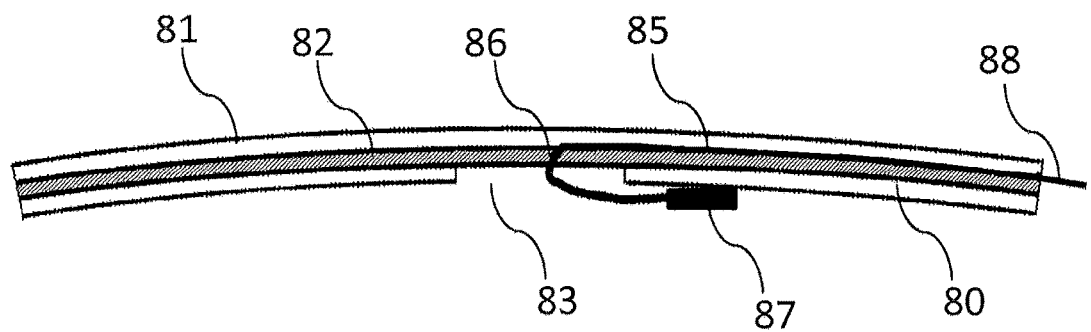

FIG. 9 illustrates a laminated glazing that can be produced according to the invention. The laminated glazing comprises a first sheet of glass 80, a second sheet of glass 81 and a separator film 82 made of thermoplastic polymer (PVB), arranged between the two sheets of glass. The first sheet of glass 80 comprises a through hole 83, whereas, at the same point, the other sheet of glass is not pierced. The laminated glazing comprises a conductor wire 85 which is arranged between the separator film 82 and the second sheet of glass 81. This provides it with a protection incorporated in the laminated glazing. The separator film 82 is provided with a through orifice 86 which emerges inside the hole 83 of the first sheet of glass 80 to allow for the passage of the conductor wire 85 through the separator film 82 and through the first sheet of glass 80. Thus, this orifice 86 has an outline corresponding to that of the conductor wire. The conductor wire 85 has an end intended to be connected to an accessory 87, the other end exiting from the glazing on the outer edge at 88. The other end of the conductor wire 85 is intended to be connected to an electrical power supply and/or an electrical device on the vehicle, preferably via a connector. The through hole 83 is, for example, circular for ease of manufacture. It must be small enough to allow the laminated glazing to comply with the standard R43 and big enough to allow for the through passage of the conductor wire, even of the connector. Thus, preferably, the first hole 83 has a diameter of between 3 and 80 mm.

The invention claimed is:

1. A method for manufacturing dished laminated glazing comprising two sheets of glass, a separator layer made of polymer material arranged between the sheets of glass, and an electrical conductor, said method comprising:
performing a simultaneous thermal dishing of the sheets of glass in a paired state;
after the simultaneous thermal dishing, cooling the sheets of glass, and
assembling the laminated glazing by bonding of the sheets of glass to the separator layer on either side thereof,
wherein said cooling comprises a controlled cooling of the sheets of glass in the paired state, the controlled cooling comprising a general controlled cooling and a local controlled cooling of a cutting zone, the local controlled cooling being faster than the general controlled cooling, and
wherein a cutting of one of the sheets of glass along a cutting line in the cutting zone is performed to form a holed zone, the electrical conductor being placed between the sheets of glass and exiting from the laminated glazing through the holed zone.

2. The method as claimed in claim 1, wherein the cutting is performed before the thermal dishing.

3. A method for manufacturing dished laminated glazing comprising two sheets of glass, a separator layer made of polymer material arranged between the sheets of glass, and an electrical conductor, said method comprising:
performing a simultaneous thermal dishing of the sheets of glass in a paired state;
after the simultaneous thermal dishing, cooling the sheets of glass, and
assembling the laminated glazing by bonding of the sheets of glass to the separator layer on either side thereof,
wherein said cooling comprises a controlled cooling of the sheets of glass in the paired state, the controlled cooling comprising a general controlled cooling and a local controlled cooling of a cutting zone, the local controlled cooling being faster than the general controlled cooling, and
wherein a cutting of one of the sheets of glass along a cutting line in the cutting zone is performed to form a holed zone, the electrical conductor being placed between the sheets of glass and exiting from the laminated glazing through the holed zone, and
wherein the cutting is performed after the cooling.

4. The method as claimed in claim 3, wherein the general controlled cooling generates compression stresses on outer edges of the sheets of glass, forming a peripheral belt of compression stresses between 4 and 20 MPa.

5. The method as claimed in claim 3, wherein the local controlled cooling of the cutting zone is sufficient in duration and in intensity for edge stresses of the holed zone after cutting to be greater than 4 MPa.

6. The method as claimed in claim 5, wherein the edge stresses of the holed zone after cutting are greater than 8 MPa.

7. The method as claimed in claim 3, wherein the local controlled cooling is performed by a local blowing of air that is cooler than ambient air surrounding the sheets of glass in the paired state.

8. The method as claimed in claim 3, wherein the holed zone forms an orifice.

9. The method as claimed in claim 3, wherein the holed zone comprises a notch in an outer edge of the sheet of glass that includes it.

10. The method as claimed in claim 3, wherein the holed zone is produced in a first of the sheets of glass, no holed zone being produced in a second of the sheets of glass facing the holed zone of the first of the sheets of glass.

11. The method as claimed in claim 3, wherein the general controlled cooling is performed by a first cooling system and the local controlled cooling of the cutting zone is performed by a second cooling system that is different from the first cooling system.

12. The method as claimed in claim 11, wherein the second cooling system is configured to cool the cutting zone by convection, conduction, radiation or any combination thereof.

13. The method as claimed in claim 11, wherein the second cooling system includes a nozzle to locally supply blowing air to the glass sheets.

14. The method as claimed in claim 11, wherein the first cooling system includes a cooling chamber in which the sheets of glass are positioned.

15. The method as claimed in claim 11, wherein at least part of the local controlled cooling is performed during the general controlled cooling.

16. The method as claimed in claim 11, wherein the local controlled cooling begins before the general controlled cooling.

17. The method as claimed in claim 1, wherein the local controlled cooling of the cutting zone is sufficient in duration and in intensity for edge stresses of the holed zone after cutting to be greater than 4 MPa.

18. The method as claimed in claim 17, wherein the edge stresses of the holed zone after cutting are greater than 8 MPa.

19. The method as claimed in claim 1, wherein the local controlled cooling is performed by a local blowing of air that is cooler than ambient air surrounding the sheets of glass in the paired state.

20. The method as claimed in claim 1, wherein the general controlled cooling is performed at a speed contained in the range from 0.3 to 8° C./second between 580 and 520° C.

21. The method as claimed in claim 1, wherein the electrical conductor is a ribbon cable containing a plurality of metallic electrical cables.

22. The method as claimed in claim 1, wherein the electrical conductor has a thickness in a direction at right angles to the glazing lying within the range ranging from 0.05 to 1 mm.

23. The method as claimed in claim 22, wherein the thickness is within the range from 0.08 to 0.5 mm.

24. The method as claimed in claim 1, wherein the holed zone forms an orifice.

25. The method as claimed in claim 1, wherein the holed zone comprises a notch in an outer edge of the sheet of glass that includes it.

26. The method as claimed in claim 25, wherein the notch has a depth of at least 0.5 cm toward an interior of the sheet of glass that includes it.

27. The method as claimed in claim 1, wherein the holed zone is produced in a first of the sheets of glass, no holed zone being produced in a second of the sheets of glass facing the holed zone of the first of the sheets of glass.

28. The method as claimed in claim 27, wherein the separator layer is not cut facing the holed zone of the first of the sheets of glass except, if necessary, according to an outline corresponding to that of the electrical conductor passing through it.

29. The method as claimed in claim 1, wherein the local controlled cooling of the cutting zone is sufficient in duration and in intensity for edge stresses of the holed zone after cutting to be greater than 4 MPa, and wherein the local controlled cooling is performed by a local blowing of air that is cooler than ambient air surrounding the sheets of glass in the paired state.

30. The method as claimed in claim 29, wherein the holed zone is produced in a first of the sheets of glass, no holed zone being produced in a second of the sheets of glass facing the holed zone of the first of the sheets of glass.

31. The method as claimed in claim 1, wherein the general controlled cooling is performed by a first cooling system and the local controlled cooling of the cutting zone is performed by a second cooling system that is different from the first cooling system.

32. The method as claimed in claim 31, wherein the second cooling system is configured to cool the cutting zone by convection, conduction, radiation or any combination thereof.

33. The method as claimed in claim 31, wherein the second cooling system includes a nozzle to locally supply blowing air to the glass sheets.

34. The method as claimed in claim 31, wherein the first cooling system includes a cooling chamber in which the sheets of glass are positioned.

35. The method as claimed in claim 31, wherein at least part of the local controlled cooling is performed during the general controlled cooling.

36. The method as claimed in claim 31, wherein the local controlled cooling begins before the general controlled cooling.

* * * * *